UNITED STATES PATENT OFFICE.

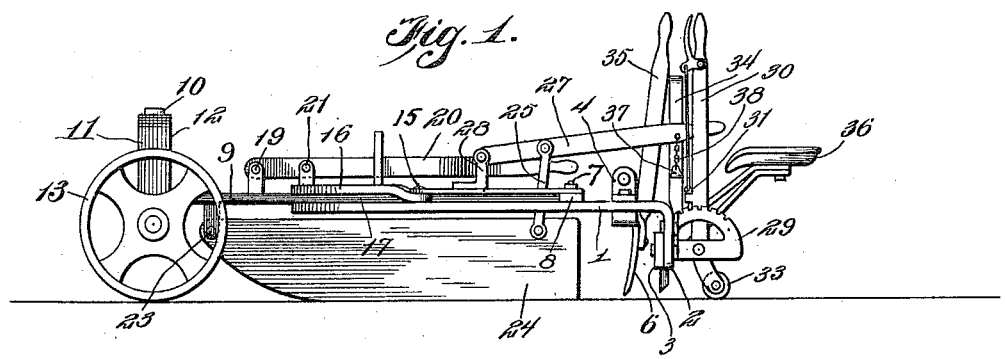

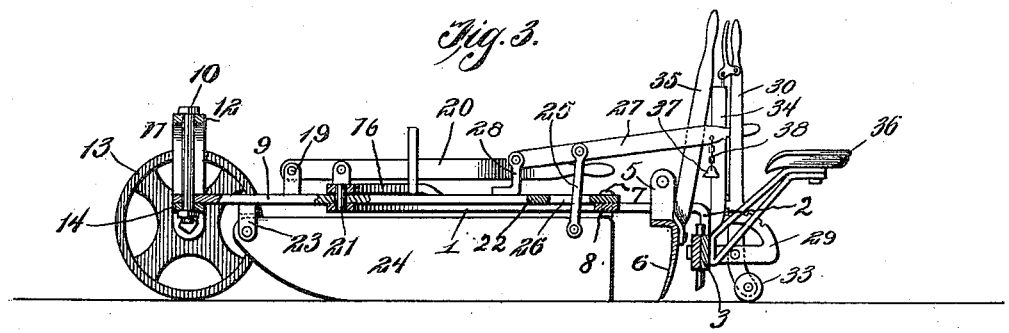
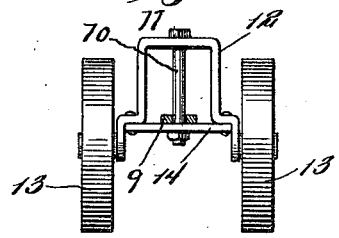
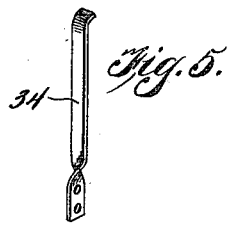

OMER P. FOOTE, OF FREDERICKTOWN, OHIO.

HARROW.

985,579.  Specification of Letters Patent.  Patented Feb. 28, 1911.

Application filed January 20, 1910.  Serial No. 538,969.

*To all whom it may concern:*

Be it known that I, OMER P. FOOTE, a citizen of the United States, residing at Fredericktown, in the county of Knox and State of Ohio, have invented new and useful Improvements in Harrows, of which the following is a specification.

My invention relates to harrows and scrapers, and one of its objects is to provide a device of this character which the operator may so control or manipulate that either the harrow or scraper may be placed in operation without the operator leaving his position on the machine.

Another object is to provide means whereby the harrow or scraper may be positively set at various angles to the line of travel.

A further object is to provide means for preventing the skidding of said harrow or scraper.

With these objects in view the invention consists in the construction and arrangement of parts as illustrated in the accompanying drawings, in which:—

Figure 1 is a side elevation. Fig. 2 is a top plan view. Fig. 3 is a central longitudinal section. Fig. 4 is a detail of the front truck. Fig. 5 is a perspective of the device for holding the scraper blade in inoperative position.

Referring to the drawings the numeral 1 designates a bar or frame of semi-circular conformation having the ends 2 downturned and the harrow bar 3 secured thereto. To the upper face of the semi-circular bar or frame 1, at a point slightly in advance of the harrow bar 3 are secured brackets 4 to which are pivoted the ears 5 of a scraper-blade 6.

Pivoted as at 7 to a bar 8 secured to the frame 1 is a tongue or draft bar 9 to the forward end of which is pivoted by the king-bolt 10 the front truck or carrier 11. The front truck consists of the arched bar 12 the ends of which carry the wheels 13 and a brace bar 14 secured to the arched bar 12.

To the upper face of the bar 1 at the points 15—15 is secured the raised bar 16 thus forming a slot 17 for the passage of the tongue 9. The raised bar 16 and the main bar 1 to which it is secured are provided with apertures 18 in alinement with an aperture on the tongue 9. To the front of the tongue 9 is pivoted, as at 19, a hand lever 20, having a bolt 21 pivoted thereto and adapted to enter one of the apertures 18 and the one in the tongue thereby holding said frame in adjusted position.

From the bar 8 to the points 15 where the raised bar 16 is secured upon the frame bar 1 extend brace bars 22.

Pivoted to a lug 23 depending from the forward end of the tongue 9 is a shoe or runner blade 24 extending rearwardly beneath said tongue and operated by means of a link 25 pivoted to said blade or shoe, said link extending through a slot 26 in the tongue 9 and pivoted to a hand lever 27 which is pivoted to a standard 28 secured to the tongue.

To the rear face of the harrow bar are hingedly secured notched segments 29 to which are pivoted hand levers 30 having the usual dog 31 to engage the notched segments 29. The hinging of the segments 29 permits said segments and levers 30 to follow the line of travel of the machine. The lower ends of the hand levers 30 are provided with wheels or rollers 33. Also secured to the harrow bar and extending upward therefrom is a standard 34 behind which a lever 35 secured to the scraper or blade 6, may be snapped thereby holding said scraper or blade in inoperative position.

An operator's seat 36 is provided at the rear end of the machine.

In operation the harrow and scraper carrying frame may be set at the desired angle by means of the bolt 21, pivoted to the hand lever 20, being forced into the apertures 18 and the one in the tongue thereby rigidly holding said tongue and frame in adjusted position. When the handle or lever 35 is released from the standard 34 and pushed forward the scraper or blade is forced into engagement with the ground and the forward movement of the machine will cause the harrow teeth to be raised. Both the scraper and harrow may be thrown out of operative position by the rearward movement of the hand levers 30. To prevent skidding of the machine the shoe or runner blade 24 is forced into the ground by means of the hand lever 27. If desired, the shoe may be depressed by the foot of the operator by means of a stirrup 37 depending from a chain 38 secured to the lever 27.

Having thus described the invention what I claim as new, is—

1. In a device of the character described, a frame having a harrow secured thereto, a scraper hinged to said frame, means for throwing said harrow and scraper in inoperative position, means for throwing said scraper in operative or inoperative position, means for locking said scraper in inoperative position, a tongue pivoted to said frame, a lever pivoted to said tongue, a bolt pivoted to said lever, said bolt serving to lock said tongue to said frame, and a truck pivoted to the forward end of said tongue.

2. In a device of the character described, a frame of semi-circular conformation, a harrow secured to the free ends of said frame, a scraper hinged to said frame in advance of said harrow, levers for throwing said harrow into operative or inoperative position, a handle for throwing said scraper into operative or inoperative position, means for locking said scraper in inoperative position, a tongue pivoted to said frame, a lever pivoted to said tongue, a bolt pivoted to said lever and adapted to lock said tongue to said frame, and a truck pivoted to said tongue.

3. In a device of the character described, a frame of semi-circular conformation, a harrow secured to said frame, a scraper hinged to said frame in advance of said harrow, a tongue pivoted to said frame, a shoe pivoted to said tongue, means for raising and lowering said shoe, and a truck pivoted to the forward end of said tongue.

4. In a device of the character described, a frame of semi-circular conformation, a harrow secured to said frame, a scraper hinged to said frame in advance of said harrow, a tongue pivoted to said frame, means for locking at various points said tongue to said frame, a shoe pivoted beneath said tongue, a lever pivoted to said tongue, a link pivoted to said lever and shoe, and a stirrup suspended from said lever, substantially as described.

5. In a device of the character described, a frame of semi-circular conformation including a diametrical rear cross bar, a scraper connected with the frame in approximate parallel relation to the cross bar, a tongue pivoted centrally upon the cross bar, means for connecting the tongue with the frame at various angles to the cross bar, and a runner blade connected directly with the tongue.

6. In a device of the character described, a frame of semi-circular conformation including a diametrical rear cross bar, a scraper connected with the frame in approximate parallel relation to the cross bar, a tongue pivoted centrally upon the cross bar, means for connecting the tongue with the frame at various angles to the cross bar, a runner blade pivotally connected with the tongue, and adjusting means for said runner blade.

In testimony whereof I affix my signature in presence of two witnesses.

OMER P. FOOTE.

Witnesses:
DAVID F. EWING,
A. T. FULTON.

---

Copies of this patent may be obtained for five cents each, by addressing the "Commissioner of Patents, Washington, D. C."